United States Patent [19]
Sedun

[11] Patent Number: 5,035,956
[45] Date of Patent: Jul. 30, 1991

[54] LUMBER PRODUCT PROTECTED BY AN ANTI-FUNGAL COMPOSITION

[75] Inventor: Frederick S. Sedun, Brentwood Bay, Canada

[73] Assignee: Safer, Inc., Newton, Mass.

[21] Appl. No.: 391,416

[22] Filed: Aug. 9, 1989

[51] Int. Cl.[5] .............................................. B32B 21/04
[52] U.S. Cl. .............................. 428/537.1; 106/15.05; 424/405; 427/440; 428/541; 514/547; 514/550
[58] Field of Search ...................... 106/15.05; 424/404, 424/405; 427/440; 428/541, 537.1; 514/550, 547; 523/122, 124

[56] References Cited

U.S. PATENT DOCUMENTS

| | | | |
|---|---|---|---|
| 2,692,204 | 10/1954 | Nowak | 106/15 |
| 2,883,317 | 4/1959 | Heininger et al. | 514/550 |
| 3,179,608 | 4/1965 | Broadhead | 260/404.8 |
| 3,181,992 | 5/1965 | Michalski et al. | 106/18.34 |
| 3,214,459 | 10/1965 | Miller | 106/18.34 |
| 3,517,314 | 11/1971 | Hill | 106/2 |
| 4,055,663 | 10/1977 | Barer et al. | 514/547 |
| 4,066,786 | 1/1978 | Bent et al. | 514/547 |
| 4,140,649 | 2/1979 | Bossert et al. | 252/105 |
| 4,307,089 | 12/1981 | Melloh et al. | 424/245 |
| 4,496,576 | 1/1985 | Loncrini et al. | 514/389 |
| 4,719,235 | 1/1988 | Kern | 514/547 |
| 4,732,817 | 3/1988 | Lotz et al. | 428/541 |
| 4,752,617 | 6/1988 | Kern | 514/547 |
| 4,786,326 | 11/1988 | Grove | 106/15.05 |
| 4,885,310 | 12/1989 | Kern | 514/547 |

FOREIGN PATENT DOCUMENTS

| | | |
|---|---|---|
| 61-139401 | 6/1986 | Japan . |
| 63-41405 | 2/1988 | Japan . |
| 63-48202 | 2/1988 | Japan . |

OTHER PUBLICATIONS

Chemical Abstract No. 105:116741h; Foreth et al., 3/85.

*Primary Examiner*—Shrive Beck
*Assistant Examiner*—Terry J. Owens
*Attorney, Agent, or Firm*—Lahive & Cockfield

[57] ABSTRACT

An effective, environmentally compatible anti-fungal composition for protecting lumber from infestation by wood-staining and wood-rotting fungi comprises, as an active ingredient, an alkyl sulfosuccinate compound. A preferred alkyl sulfosuccinate is dioctyl sodium sulfosuccinate. The anti-fungal composition may further comprise water and an adjuvant such as sodium benzoate or a lower alcohol or diol (e.g., ethanol, isopropanol, ethylene glycol or propylene glycol). The composition may also comprise an oil component such as a paraffinic mineral oil, a triglyceride or a terpenoid based oil. The concentration of active ingredient present in the composition ranges between 0.5 and 10.0% by weight.

6 Claims, No Drawings

LUMBER PRODUCT PROTECTED BY AN ANTI-FUNGAL COMPOSITION

BACKGROUND OF THE INVENTION

The present invention relates to environmentally safe fungicidal compositions. More particularly, the invention relates to fungicidal compositions for protecting wood and wood products.

Freshly cut lumber is readily colonized by a range of fungi and other wood putrefying organisms. These fungi may have the appearance of molds which grow on the surface of the wood and cause discoloration of the wood. The fungi may also colonize and stain the sapwood portion of the lumber. Some fungi and other organisms may also invade and cause rotting of the lumber. The presence of such fungi and other wood putrefying organisms greatly reduces the commercial value of the lumber, and unless the lumber is treated to prevent fungal growth, such growth will occur.

Many formulations for killing fungi and controlling their growth on wood are well known. Among the more effective fungicides are sodium pentachlorophenate (NaPCP) and sodium tetrachlorophenate (NaTCP), both of which are relatively inexpensive. Although these compounds have been widely used in the past, they have several drawbacks in that they are highly toxic to humans and animals and may be environmentally hazardous. As a result, their use has been prohibited in many countries.

Alternative fungicidal compositions include an active ingredient consisting of known fungicidal agents, such as N-cyclohexyl-N-methoxy-2, 5-dimethyl-3-furanecarboxamide; tris-(N-cyclohexyl diazeniumdioxy)-aluminum; N,N-dimethyl-N'-phenyl-(N'-fluorodichloro methylthio)-sulphamide; N-cyclohexyl diazeniumdioxy-potassium; bis(dimethylthio carbamoyl) disulfide; tributyl-tin-fumarate; tributyl-tin oxide; and tributyl-tin-phthalate. These active ingredients are combined with a wetting agent such as sodium 1,4-bis-(2-ethylhexyl)-sulfosuccinate. This mixture may be combined with a liquid carrier such as kerosene, xylene, methyl naphthalene, dimethyl formamide, and dimethyl sulfoxide and then applied to wood to protect it against fungi and putrefying microorganisms. Such compositions are disclosed in Japanese patent application no. 63-48,202 and Japanese patent application no. 63-41,405. Although such formulations may be effective as fungicides, the active ingredient of the composition may pose unnecessary risks to users, humans, and other animals, as well as to the environment.

Accordingly, it would be desirable to provide an effective anti-fungal composition which is virtually harmless to humans and animals and which poses virtually no threat to the environment. It is thus an object of the present invention to provide such an environmentally safe anti-fungal composition. Another object is to provide an anti-fungal composition which may be effectively applied to wood and lumber products to control and prevent the growth of wood staining and decomposing organisms. Other objects of the invention will be apparent to those having ordinary skill in the art upon reading the present disclosure.

As used herein the terms "fungicide" and "anti-fungal composition" are used interchangably to denote a composition which kills wood-staining and decomposing organisms and/or prevents their growth on wood and lumber. In addition, the word "pesticide" may be used in a generic sense to include insecticides, fungicides, miticides and herbicides.

SUMMARY OF THE INVENTION

It has been discovered that alkyl-sulfosuccinates, particularly dioctyl sodium sulfosuccinate, may be used as the active ingredient in an anti-fungal composition for wood and lumber. Such an anti-fungal composition has been found to effectively control and prevent the growth of wood-staining and wood-decomposing fungi on wood and lumber products. Moreover, a composition comprising such a fungicidal active ingredient is environmentally safe, biodegradable and does not threaten the health of humans and other animals.

The alkyl sulfosuccinate active ingredient is used in an anti-fungal composition which may also include an adjuvant (e.g., ethanol, isopropanol, ethylene glycol, propylene glycol or sodium benzoate) and an oil component (e.g., a paraffinic mineral oil, a triglyceride, or a terpenoid-based oil). A defoaming agent may also be included in the composition to improve the mixing and storage characteristics of the formulation.

Typically, the fungicidal composition is applied in a concentration such that the active ingredient, an alkyl sulfosuccinate compound, comprises approximately 0.5 to 10.0 percent by weight of the anti-fungal composition, the adjuvant comprises approximately 0.0 to 1.5 percent by weight and the oil component comprises approximately 0.0 to 1.0 percent by weight. The balance of the composition is water.

The anti-fungal coating composition of the present invention may be applied to freshly cut lumber and to wood products in order to protect against a variety of common fungi. The composition effectively controls surface molds of the genera Penicillium, Aspergillus, Fuşarium, Rhizopus, Trichoderma, Cephaloascus, Chaetomium and Chalara: sapwood-staining fungi of the genera Ceratocystis, Alternaria, Hypoxylon, Xylaria, Graphium, Diplodia, Cladosporium, Aureobasidium, Phialophora and Ophistoma: and wood-rotting fungi of the genera Poria, Peniophora and Lenzites.

One preferred alkyl sulfosuccinate for use as an active ingredient in the anti-fungal composition of the present invention is dioctyl sodium sulfosuccinate. Other chemical names which describe this compound include docusate sodium; sulfosuccinic acid 1,4-bis (2-ethylhexyl) sodium sulfosuccinate; and sodium diocyl sulfosuccinate.

DETAILED DESCRIPTION OF THE INVENTION

The present invention comprises an anti-fungal composition which includes an alkyl sulfosuccinate active ingredient which may be combined with an oil component and an adjuvant. A defoaming agent may also be present in the system to aid in processing the composition. The composition typically is prepared in a concentrated formulation, either in a liquid or solid form, which may be diluted with water to a ready-to-use, liquid formulation having a desired concentration of active ingredient. The concentrate may contain from as little as about 20% to as much as 100% alkyl sulfosuccinate active ingredient, in either a liquid or solid form. In one embodiment the concentrate may be a liquid which includes approximately 55% to 80% alkyl sulfosuccinate, 2% to 20% ethanol and 15% to 35% water. In another embodiment the concentrate may be a powder having approximately 75% to 90% alkyl sulfosuccinate and 10% to 25% sodium benzoate. In a more preferred embodiment, however, the concentrate is a liquid which includes 60% to 75% alkyl sulfosuccinate, 3% to 10% ethanol, 15% to 25% water, 5% to 50% oil component and less than 1% defoaming agent. Most preferably the concentrate is a liquid having 67.5% alkyl sulfosuccinate, 4.5% ethanol, 18% water, 9.8% oil component and 0.2% defoaming agent. The concentrated formulation is diluted before use with water to yield a ready-to-use composition having approximately 1.0–6.0% active ingredient together with commensurately dilute quantities of the other components of the formulation. This formulation is an environmentally safe, biodegradable fungicide which controls the growth of fungi and other putrefying organisms on wood and wood products.

The preferred alkyl sulfosuccinate compound is dioctyl sodium sulfosuccinate which may be obtained from a variety of sources in either a liquid or solid state. Other suitable alkyl sulfosuccinate compounds include those having the general formula:

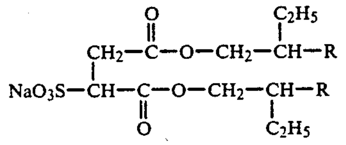

wherein R represents a hydrocarbon chain having from 1 to 18 carbon atoms. Most preferably, as noted above, the active ingredient is dioctyl sodium sulfosuccinate wherein R is $C_4H_9$.

The preferred compound is sold under the trademark Aerosol TO by Cyanamid of Canada, Ltd., Montreal, Quebec. Aerosol OT is available in a 100% concentration and a 75% concentration which also contains 5% ethanol and approximately 20% water. Dioctyl sodium sulfosuccinate also is sold under the trademark Aerosol OT-B, by Cyanamid of Canada, Ltd., as a powdered composition containing approximately 85% dioctyl sodium sulfosuccinate and about 15% sodium benzoate. Other suitable dioctyl sodium sulfosuccinate compounds may be obtained from a variety of other manufacturers in addition to Cyanamid of Canada, Ltd.

The oil component of this pesticidal composition may comprise a paraffinic mineral oil, a triglyceride or a terpenoid-based oil. The preferred mineral oils are refined horticultural oils such as paraffinic, natural petroleum distillates. Examples of preferred mineral oils are commercially available under the trademark SUNSPRAY from Sun Refining & Marketing Company of Philadelphia, Penna. Preferred SUNSPRAY oils include SUNSPRAY 6E, 6E Plus, and 6N. In addition to mineral oils, terpenoid-based oils, including pine oil, cedar oil, eucalyptus oil and the like may be used. Alternatively, triglycerides such as cottonseed oil, soy oils and other vegetable oils may be used. Currently, the preferred oil component is a paraffinic mineral oil or a pin oil. The mineral oil is preferred over the pine oil in instances where the strong odor of pine oil would be objectionable.

A concentrate which is prepared in a dry, powdered state preferably includes sodium benzoate as a formulation enhancing water soluble carrier. Liquid concentrates may include adjuvants such as ethanol, isopropanol, ethylene glycol or propylene glycol. Ethanol is the preferred adjuvant for liquid concentrates as it effectively prevents gelation of the active ingredient. Most or all of the ethanol (or other volatile adjuvants) will evaporate during or after application of the composition to wood.

Defoaming agents preferably are included in the concentrate to prevent excessive foaming of the formulation during transport and dilution to a ready to use state. Virtually any effective defoaming agent may be used, however, preferred defoaming agents are those which are non-toxic and environmentally compatible. Exemplary defoaming agents include GP-300, GP-210, DK-100, DK-230 and DB-12 available from Genesee Polymers Corporation, Flint, Mich. and C-Emulsion and Antifoam FG-10 available from Dow Corning Corporation, Midland, Mich.

The pesticidal formulation of this invention is effective when it is applied to wood with concentrations of the active ingredient ranging from about 0.5% to 10.0%. The preferred concentration of the active ingredient is in the range of about 1.0% to 6.0%, and most preferably from 1.0% to 4.0%. A ready-to-use formulation includes commensurately diluted concentrations of other components.

Examples of various preferred fungicial formuations are shown below in Table I.

TABLE I (Various Formulations of Fungicide Concentrate)

| Formulation | Component | |
|---|---|---|
| A | dioctyl sodium sulfosuccinate | 75.0% |
| | ethanol | 5.0% |
| | water | 20.0% |
| B | dioctyl sodium sulfosuccinate | 85.0% |
| | sodium benzoate | 15.0% |
| C | dioctyl sodium sulfosuccinate | 67.5% |
| | ethanol | 4.5% |
| | mineral oil | 9.8% |
| | water | 18.0% |
| | defoaming agent | 0.2% |

The formulations set forth in Table I each effectively combat common fungi and other wood staining and putrefying organisms. However, formulation "C" is preferred as it is most easily prepared and stored. This concentrate may be diluted to a ready-to-use formulation having between 1 and 6% active ingredient, and preferably 4.0%, 2.0% or 1.0% active ingredient. Although in Table I the concentration of dioctyl sodium sulfosuccinate (the active ingredient) is presented as either 1.0, 2.0, 2.5, or 4.0%, it is understood that this concentration may be varied between 0.5 and 10.0%, and that the change in the concentration of active ingredient will result in alterations in the concentration of other components. It has been found that the composition is most effective and most easily and economically prepared when the concentration of active ingredient in a ready-to-use formulation is between 1 and 4.0%.

The fungicidal formulation of the present invention may be easily prepared by one of ordinary skill in the art using conventional formulation and mixing techniques. Preferably, the formulation is prepared by first adding the alkyl sulfosuccinate component to a suitable container, together with any adjuvants (e.g., ethanol). Next, either the oil component or a defoaming agent may be added to the container and the mixture is stirred. Following stirring, the defoaming agent may be added, if it was not previously added, and the mixture is again stirred.

The pesticidal composition of the present invention may be applied to protect wood and wood products from infestation by sapstain fungi and other wood putrefying organisms. Preferably, the composition may be applied to freshly cut and milled commercially used timber including pine woods, oaks, maples, cherry wood, cedar, redwood, teak, hemlock and the like. The composition of the present invention may be applied in a manner consistent with that used to apply other wood-protecting fungicides, such as by dipping or spraYing. One preferred method of application is by dipping the wood in a solution of the anti-fungal composition for between 1 and 60 seconds. Such treatment with the anti-fungal composition of this invention is normally effective to protect freshly cut and milled lumber against fungal infestation for at least 6 months.

This composition is effective in protecting wood and wood products from a variety of common wood-staining and wood-rotting fungi. This anti-fungal composition protects wood from a wide variety of species of wood-staining and wood-rotting fungi, including those from the genera Penicillium, Asperoillus, Fusarium, Rhizopus, Trichoderma, Cephaloascus, Chaetomium, Chalara, Ceratocystis, Alternaria, Hypoxylon, Xylaria, Graphium, Diplodia, Claudosporium, Aurebasidium Phialophora, Ophistoma, Poria, Peniophora and Lenzites. The composition is particularly effective in protecting against the following: Aspergillus niger, Aureobasdium pullans, Cephaioascus fragrans, Chalara species, Ophistoma species, Penicillium species, (blue color) Penicillium species (olive-brown color), Phialophora fastigata and Trichoderma pseudokoningii.

The following non-limiting examples serve to further describe the invention.

EXAMPLE 1

Freshly cut, untreated lumber was obtained from a saw mill, and further cut into small boards (1"×4"×24"). The boards were soaked for various lengths of times in fungicidal solutions, dried for 24 hours, and innoculated with a spore suspension containing approximately 106 spores per ml of the following fungi: Aspergillus niger: Aureobasidium pullans: Cephalascus fragrans; Chalara species: Ophistoma species: Penicillium species (blue color); Penicillium species (olive-brown color); Phialophora fastigata: and Trichoderma pseudokoningii.

To promote fungal growth, the boards were tightly stacked, covered with moist cardboard, and wrapped in several layers of clear plastic film. At monthly intervals after the start of the tests, the boards were unwrapped and evaluated for the amount of fungal growth visible on the wood. The recorded data represent the average fungal growth observed on any board for a given anti-fungal solution. The data shown below represent tests performed with the anti-fungal formulations identified in Table I.

TABLE II (Anti-Fungal Activity of Various Formulations)

| Formulation[1] (Concentration Of Active) | Proportion of Wood Surface (%) With Fungal Growth Four Months After Inoculation | | | | |
|---|---|---|---|---|---|
| | Test 1[2] | Test 2 | Test 3 | Test 4 | Test 5[3] |
| A (4.0%) | — | — | — | — | 1.5% |
| C (4.0%) | — | — | — | — | 1.4 |
| A (2.5%) | 3.0% | 7.8% | — | 4.5% | — |
| B (2.5%) | 5.1 | 1.3 | 0.7% | 2.8 | — |
| A (2.0%) | — | — | — | — | 1.6 |
| C (2.0%) | — | — | — | — | 1.9 |
| A (1.0%) | 3.8 | 1.9 | — | — | 5.5 |
| B (1.0%) | 6.0 | 0.7 | — | — | — |
| C (1.0%) | — | — | — | — | 1.6 |
| Na PCP (1.0%) | 6.0 | 2.1 | 1.1 | 4.2 | 11.0 |
| Water | 42.0 | 20.8 | 25.6 | 38.0 | 25.8 |
| Untreated | 44.7 | 25.1 | — | 38.8 | — |

[1]The solutions used were prepared by diluting the formulations (A, B, C), listed in Table I, to the indicated active ingredient concentrations with commensurate dilutions of the other components.
[2]Not all of the concentrations of the three formulations were tested in each of the five field tests. The concentrations that were not tested are denoted by a "—".
[3]The measurements of test 5 were recorded 2 months after inoculation.

What is claimed is:

1. A lumber product resistant to growth of sapstain fungi and mold, said lumber product comprising:
   unseasoned, cut wood having on a surface thereof an anti-fungal composition consisting essentially of a fungicidally effective concentration ranging from about 0.5% to 10% by weight of an alkyl sulfosuccinate salt compound, as an active ingredient, in which the alkyl groups of the alkyl sulfosuccinate salt compound have between 5 and 22 carbon atoms, and an oil component.

2. The lumber product of claim 1 wherein the anti-fungal composition further comprises an adjuvant selected from the group consisting of sodium benzoate, ethanol, isopropanol, ethylene glycol and propylene glycol.

3. The lumber product of claim 1 wherein said oil component is selected from the group consisting of a paraffinic mineral oil, a triglyceride, and a terpenoid-based oil.

4. The lumber product of claim 1 wherein the alkyl sulfosuccinate compound is dioctyl sodium sulfosuccinate.

5. The lumber product of claim 1 wherein the alkyl sulfosuccinate compound has the formula:

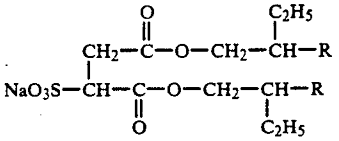

wherein R represents $C_4H_9$.

6. A lumber product comprising unseasoned, cut wood having on a surface thereof an anti-fungal composition which prevents the growth of sapstain fungi and mold on the surface of and within said wood, said composition consisting essentially of:
   a fungicidally effective concentration ranging from about 0.5 % to 10% by weight of an alkyl sulfosuccinate salt compound, as an active ingredient, in which the alkyl groups of the alkyl sulfosuccinate salt compound have between 5 and 22 carbon atoms.

* * * * *

UNITED STATES PATENT AND TRADEMARK OFFICE
CERTIFICATE OF CORRECTION

PATENT NO. : 5,035,956

DATED : July 30, 1991

INVENTOR(S) : Frederick S. Sedun

It is certified that error appears in the above-identified patent and that said Letters Patent is hereby corrected as shown below:

Column 2, line 37, after "Chalara" please delete ":" and insert --;--.

Column 3, line 35, after "Aerosol" please delete "TO" and insert --OT--.

Column 3, line 53, please delete "Penna" and insert --Pennsylvania--.

Column 4, line 25, please delete "fungicial formuations" and insert --fungicidal formulations--.

Column 5, line 11, please delete "spraYing" and insert --spraying--.

Column 5, line 30, please delete "Aurebasidium" and insert --Aureubasidium--.

Column 5, line 50, please delete "106" and insert --$10^6$--.

Column 5, line 51, please delete "niger:" and insert --niger;--.

Column 5, line 51, please delete "pullans:" and insert --pullans;--.

UNITED STATES PATENT AND TRADEMARK OFFICE
CERTIFICATE OF CORRECTION

PATENT NO. : 5,035,956

DATED : July 30, 1991

INVENTOR(S) : Frederick S. Sedun

It is certified that error appears in the above-identified patent and that said Letters Patent is hereby corrected as shown below:

Column 5, line 52, after "Chalara" please delete "species:" and insert --species;--.

Column 5, line 52, after "Ophistoma" please delete "species:" and insert --species;--.

Column 5, line 55, please delete "fastigata:" and insert --fastigata;--.

Signed and Sealed this

Nineteenth Day of January, 1993

*Attest:*

DOUGLAS B. COMER

*Attesting Officer* *Acting Commissioner of Patents and Trademarks*